F. E. KEYES.
FEED WATER PURIFIER.
APPLICATION FILED DEC. 19, 1908.
952,620.
Patented Mar. 22, 1910.
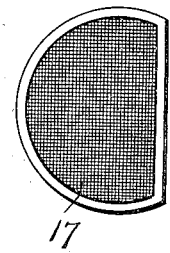
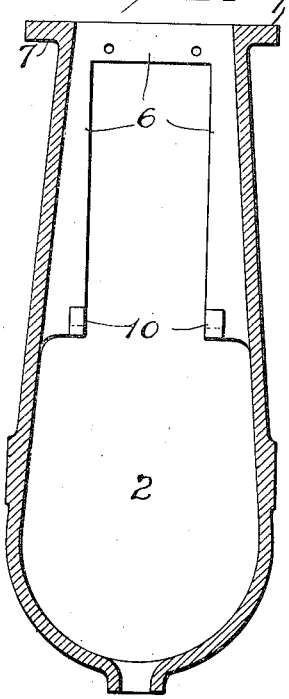
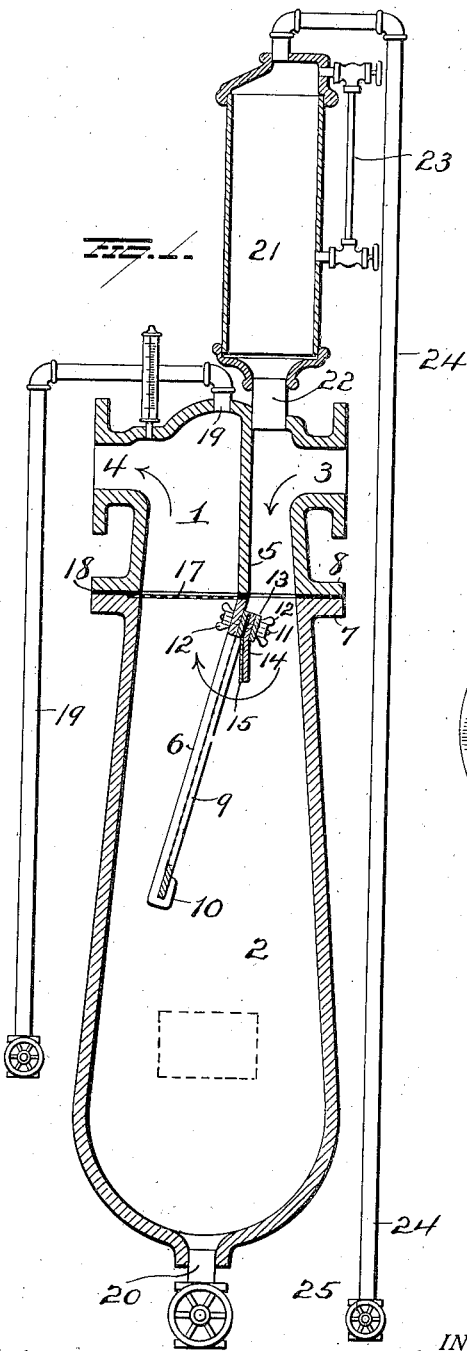
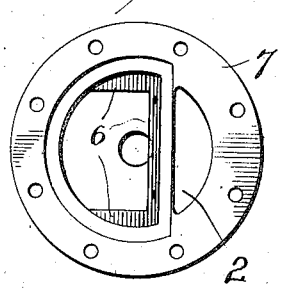
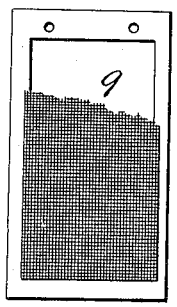
WITNESSES
E. J. Nottingham
G. F. Downing
INVENTOR
F. E. Keyes
By H. A. Seymour
Attorney

UNITED STATES PATENT OFFICE.

FRANK E. KEYES, OF NEW YORK, N. Y.

FEED-WATER PURIFIER.

952,620.  Specification of Letters Patent.  Patented Mar. 22, 1910.

Application filed December 19, 1908. Serial No. 468,331.

*To all whom it may concern:*

Be it known that I, FRANK E. KEYES, of New York, in the county of New York and State of New York, have invented certain new and useful Improvements in Feed-Water Purifiers; and I do hereby declare the following to be a full, clear, and exact description of the invention, such as will enable others skilled in the art to which it appertains to make and use the same.

My invention relates to an improvement in feed water purifiers and is designed more particularly as an improvement on the purifier patented to me July 24th, 1906, No. 826,580.

In my patent the purifying chamber is provided with a baffle plate or partition extending from the top, and terminating some distance from the bottom thereof, and inlet and outlet openings near the top and on opposite sides of said baffle plate.

Owing to the increasing use of condensation from exhaust steam, and drips and returns from various sources, it is now necessary, in order to properly prepare the water for use in a boiler, to remove not only scale or incrustation forming substances from the water, but also floating substances, such as oil and vegetable matter, as well as acids or alkalies held in solution.

The object therefore of the present invention is to provide a purifier that will separate the heavier substances from the water, and also separate or catch all floating matter and all substances lighter than water.

With these ends in view my invention consists in the parts and combination of parts as will be more fully explained and pointed out in the claims.

In the accompanying drawings, Figure 1 is a view in longitudinal section of my improvement. Fig. 2 is a view in section of the lower section of the chamber taken at right angles to Fig. 1. Fig. 3 is a view in plan of the lower section of the chamber. Fig. 4 is a view in elevation of the inclined screen and its frame, and Fig. 5 is a view in plan of the upper screen.

The water purifier is composed of two sections 1 and 2, the upper section 1 of which is provided with a water inlet 3 and an outlet 4, and a baffle plate or partition 5 located between the inlet and outlet so that all water entering the purifier, must be deflected and pass downwardly and then upwardly before reaching the outlet. The baffle plate 5 extends to the open end of section 1 and alines with the upper end of the baffle 6, formed integral with the lower section 2 of the purifier. This section 2 is rounded and larger at its bottom than its top to form a sediment chamber into which the heavier substances are precipitated, and is provided at its top with a flange 7 adapted to make a close fit with the flange 8 on section 1, the two flanges being secured together by bolts, thus forming a continuous chamber through which the water passes from the feed water heater to the boiler.

The baffle plate 6 is integral with the lower section 2 of the purifier, and forms in effect a seat or support for the screen 9, which forms a continuation of the baffle and which consists of a rectangular frame, and a wire cloth secured at its edges to the frame. The baffle plate 6, is as shown in Fig. 2, cut away, or open at its center, and is provided at its lower end on opposite sides of the central opening with the hook shaped seats 10, adapted to receive the lower end of the screen 9, the upper end of the screen being secured in place to the baffle plate 6 by the bolts 11 and thumb nuts 12. The baffle plate 6, and its attached screen rest in an inclined position, so as to gradually enlarge the space between it and the wall of the purifier on the inlet side of the baffle as clearly shown in Fig. 1.

Secured to the baffle plate 6 adjacent to the top of the screen 9, is a galvanic battery or pile composed of a copper bar 13, zinc plate 14, and a tin plate 15, the bar and two plates being in contact as shown and secured by bolts 11 to the baffle plate 6. The zinc and tin plates project downwardly over the upper end of the screen, and if the water passing through the purifier contains any acids, the current set up between the plates of the galvanic pile will cause a deposit on the plates.

The two sections 1 and 2 of the purifier may be separated and insulated from each other by a rubber gasket, and located between the two sections on the outlet side of the baffle plates is the wire screen 17, preferably reinforced, and held tightly in place by the rubber gasket 18 shown in Fig. 1.

Communicating with the top of section 1, and in a position to discharge onto screen 17, and also onto the inclined screen 9, is the steam pipe 19. By admitting steam to the purifier, all matter adhering to the screens will be blown off and the interior of the purifier cleansed, the deposit in the bottom of the chamber, and all matter dislodged from the baffles, passing out of the purifier through the washout pipe 20 in the bottom. The steam and blow out pipes are provided with suitable valves as shown.

21 is the oil chamber located above the purifier and communicating with the latter through pipe 22. This pipe is connected to the purifier on the inlet side, and adjacent to the top of the baffle plate 5.

As the water containing oil or grease or emulsion, enters the purifier, the oil, grease or emulsion being lighter than the water, rises in pipe 22 and passes into chamber 21, while the water and the heavier substances therein pass downwardly. The oil chamber is provided with a sight tube 23, through which the level of the oil may be seen, and also with a discharge pipe 24 having a valve 25, through which the oil is drawn out of oil chamber 21.

The purifier is designed for connection to the boiler feed pipe between the feed water heater and the boiler, hence the water is always under pressure when the apparatus is in use.

By providing the lower baffle with a screen, and leaving a space between the lower end of the latter and the side wall of the chamber, it will be apparent that if the screen should become clogged, the water will be deflected past the lower end of the latter consequently so long as the upper screen 17 is kept open, the water will have a free passage through the purifier, and in its passage will be freed of all substances which tend to form scale.

Having fully described my invention what I claim as new and desire to secure by Letters-Patent, is:—

1. Means for precipitating foreign matter in feed water, consisting of a chamber having inlet and outlet openings, a baffle plate or partition separating said openings, and a screen forming a continuation of said baffle plate at the lower end of the latter and terminating above the bottom of said chamber.

2. Means for precipitating foreign matter from feed water consisting of a chamber having inlet and outlet openings, a baffle plate extending from the top of the chamber to a point below said openings, and a screen forming a continuation of the baffle plate at the lower end of the latter, the lower end of the screen being removed from the side wall of the casing whereby the water has free passage around the screen.

3. Means for precipitating foreign matter in feed water consisting of a chamber having inlet and outlet openings near its upper end, a baffle plate or partition separating said openings and terminating at its lower end above the bottom of said chamber, a screen located below and adjacent to the outlet opening and a screen in a plane above the lower end of the baffle plate or partition and below the first mentioned screen.

4. Means for precipitating foreign matter in feed water consisting of a chamber having inlet and outlet openings, a baffle plate or partition separating said openings and terminating at its lower end above the bottom of said chamber, a screen forming a continuation of said baffle plate and also terminating at its lower end above the bottom of said chamber and a screen located adjacent to the outlet opening and in a plane above the top of the first mentioned screen.

5. Means for precipitating foreign matter in feed water, consisting of a chamber having inlet and outlet openings, a baffle plate or partition separating said openings and provided with an inclined depending screen, a screen located below and adjacent to the outlet opening and in a plane above the lower end of the baffle plate and said inclined screen and a steam pipe having its discharge end located above both of said screens.

In testimony whereof, I have signed this specification in the presence of two subscribing witnesses.

FRANK E. KEYES.

Witnesses:
 WILLIAM F. KEYES,
 THOMAS J. LYNCH.